US008291120B2

(12) United States Patent
Evans et al.

(10) Patent No.: US 8,291,120 B2
(45) Date of Patent: Oct. 16, 2012

(54) SYSTEMS, METHODS, AND COMPUTER PROGRAM PRODUCT FOR AUTOMATICALLY VERIFYING A STANDBY SITE

(75) Inventors: Jeffrey R. Evans, Lovettsville, VA (US); Susan M. Middleswarth, Silver Spring, MD (US); John H. Wurster, Basking Ridge, NJ (US)

(73) Assignee: Verizon Services Corp., Ashburn, VA (US)

( * ) Notice: Subject to any disclaimer, the term of this patent is extended or adjusted under 35 U.S.C. 154(b) by 499 days.

(21) Appl. No.: 11/614,732

(22) Filed: Dec. 21, 2006

(65) Prior Publication Data

US 2008/0154850 A1   Jun. 26, 2008

(51) Int. Cl.
  *G06F 15/16* (2006.01)
(52) U.S. Cl. ........... 709/249; 709/224; 714/1; 714/4.11; 714/10; 714/21
(58) Field of Classification Search .................. 709/249, 709/224–225, 200; 702/186; 370/467, 216–228, 370/241–251; 707/202; 379/221.03–221.09
See application file for complete search history.

(56) References Cited

U.S. PATENT DOCUMENTS

| | | | | |
|---|---|---|---|---|
| 5,898,667 A * | 4/1999 | Longfield et al. | ............. | 370/225 |
| 6,009,430 A * | 12/1999 | Joseph et al. | ................... | 707/10 |
| 6,078,584 A * | 6/2000 | Mottishaw et al. | ........... | 370/385 |
| 6,169,794 B1 * | 1/2001 | Oshimi et al. | ........... | 379/221.09 |
| 6,327,267 B1 * | 12/2001 | Valentine et al. | ............. | 370/466 |
| 6,438,592 B1 * | 8/2002 | Killian | ......................... | 709/224 |
| 6,697,477 B2 * | 2/2004 | Fleischer et al. | ......... | 379/211.02 |
| 6,944,184 B1 * | 9/2005 | Miller et al. | ................... | 370/467 |
| 7,035,239 B2 * | 4/2006 | McCann et al. | ............. | 370/335 |
| 7,120,688 B1 * | 10/2006 | Nguyen et al. | ................ | 709/224 |
| 7,174,009 B1 * | 2/2007 | Zhang et al. | ............. | 379/221.01 |
| 7,304,940 B2 * | 12/2007 | Larsen et al. | ................ | 370/218 |
| 7,430,646 B2 * | 9/2008 | Cox et al. | ..................... | 711/162 |
| 7,564,870 B2 * | 7/2009 | Miller et al. | ................... | 370/467 |
| 7,813,491 B2 * | 10/2010 | Kovarik et al. | ......... | 379/221.09 |
| 2002/0188711 A1 * | 12/2002 | Meyer et al. | .................. | 709/223 |
| 2003/0065986 A1 * | 4/2003 | Fraenkel et al. | ................ | 714/47 |
| 2003/0182423 A1 * | 9/2003 | Shafir et al. | ................... | 709/225 |
| 2004/0039550 A1 * | 2/2004 | Myers | .......................... | 702/186 |
| 2004/0103191 A1 * | 5/2004 | Larsson | ....................... | 709/224 |
| 2005/0144280 A1 * | 6/2005 | Kawai et al. | .................. | 709/225 |
| 2006/0034329 A1 * | 2/2006 | Miller et al. | .................. | 370/467 |
| 2007/0179993 A1 * | 8/2007 | Arruza | ......................... | 707/202 |

* cited by examiner

Primary Examiner — Greg C Bengzon

(57) ABSTRACT

Systems, methods, and computer program product are disclosed for providing a mechanism for re-routing queries in a telecommunications network. A service control point (SCP) executes an application which causes queries to be launched over a LAN or WAN to a remotely located data center. Primary and secondary data centers are defined, in which the secondary data center operates on a 'hot-standby' basis. Based on an automatically verifying system, the detection (or lack thereof) of a response from a primary data center and comparison of the response against an answer or response from another site indicates whether or not the SCP or SCP application should route queries to the secondary data center. Similarly, the same mechanism can be used to indicate that queries should be re-routed back to the primary data center.

31 Claims, 4 Drawing Sheets

SYSTEMS, METHODS, AND COMPUTER PROGRAM PRODUCT FOR AUTOMATICALLY VERIFYING A STANDBY SITE

BACKGROUND INFORMATION

The development of the Advanced Intelligent Network (AIN) has allowed telephone companies to offer various services that were heretofore difficult and expensive to develop. A variety of new services are possible by using the infrastructure of the AIN, including the ability to provide custom services to a subscriber at different locations.

The AIN architecture is dependent on network databases called Service Control Points (SCP) that store data and programs used to control various switching structures in the telephone network. Originally, the design of the AIN anticipated that the SCPs would be flexible to meet future needs, and to a large extent that has occurred. Because the SCPs are critical in providing enhanced services, the architecture was designed with redundancy. However, the SCPs are specialized processors, and fairly expensive relative to other types of processing equipment. Over time, the SCPs were required to interface with other types of databases and data centers. One rationale for interfacing SCPs with other databases was that this would allow less expensive data processing equipment to be used, as well as providing further flexibility and reduced costs. However, access to these databases and datacenters by the SCPs was not designed within the AIN architecture, and hence the robust reliability mechanisms were not readily applicable to the SCP-to-database/data center portion of the network. Thus, there is a need for flexible mechanisms to provide greater reliability and control in regard to the SCP accessing various databases and datacenters.

BRIEF DESCRIPTION OF THE DRAWING(S)

DETAILED DESCRIPTION

Exemplary embodiments are described hereinafter with reference to the accompanying drawings, in which exemplary embodiments and examples are shown. Like numbers refer to like elements throughout.

Figure 1:
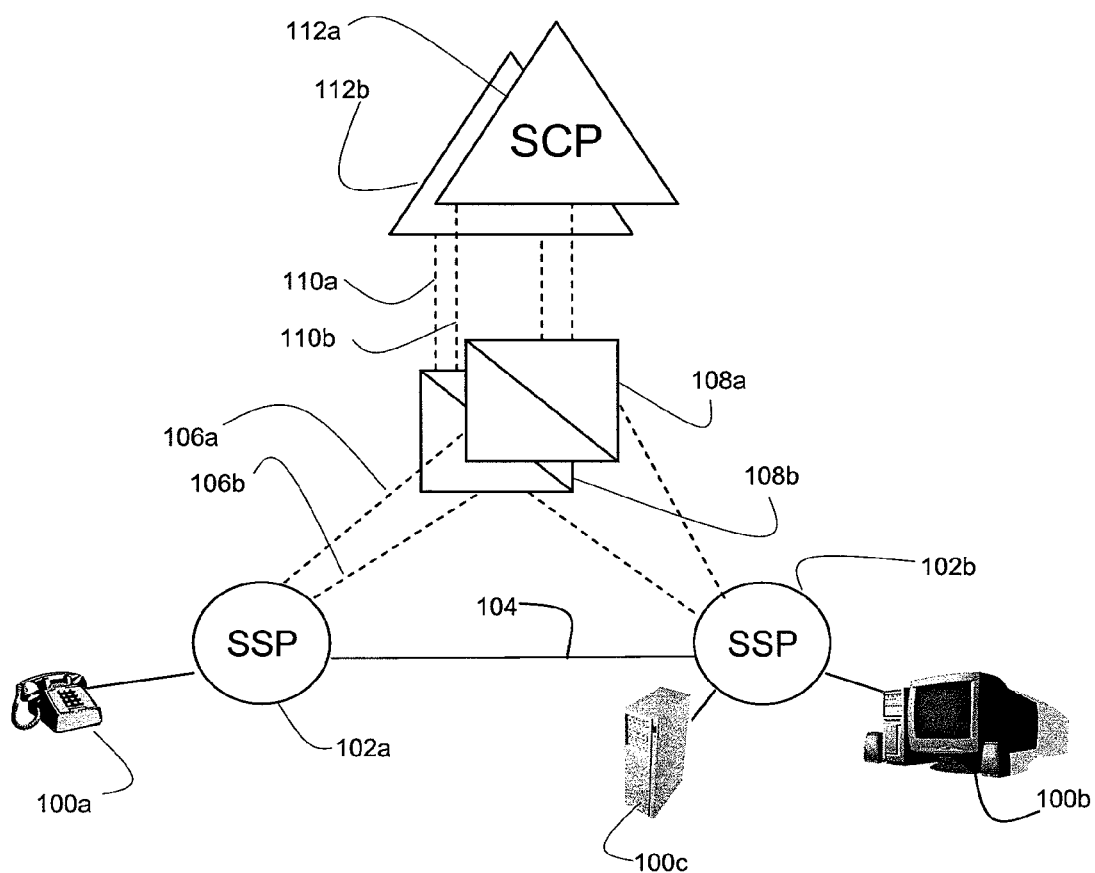
FIG. 1 illustrates one embodiment of the architectural components of an AIN.

In FIG. 1, which illustrates a conventional AIN, switching service points (SSP) 102a, 102b represent switches capable of switching calls between users of the network, represented via the telephone icon 100a, computer icon 100b, and a scheduler icon 100c. Although illustrated in terms of calls via a landline or wired connection, the SSPs can be designed to switch various types of signals including data, voice-over-IP (VoIP), wireless, and other types of calls. For example, in FIG. 2, a computer icon 100b is connected to VoIP icon 105. In addition or alternatively, other user interface devices may be connected to VoIP. The SSPs communicate using interoffice communication facilities 104, which typically are based on optical fiber communication, but again can utilize various other types of technology.

The SSPs use a signaling network and corresponding protocol, such as the well known Signaling System 7 (SS7), which comprises Signaling Transfer Points (STPs) 108a, 108b for routing signaling messages to the various network elements. The STPs are typically deployed in pairs, and each SSP is connected via signaling links 106a, 106b to each STP. Thus, if one of the STPs is unavailable, the mated STP in the pair is designed to seamlessly pick up the load.

In the alternative, SSPs may switch VoIP messages through the use of a packet switched network, such as the Internet, and corresponding protocol, such as the Session Initiation Protocol (SIP). VoIP messages are routed to an application server (AS) 112a,112b, which may function in an analogous fashion to a service control point (SCP) described below. The application servers may be deployed in pairs. The SSPs may be connected to each application server via links 105a,105b in order to bidirectionally transmit VoIP messages.

The STPs are used to route signaling messages to a specialized database, SCP. The SCPs 112a, 112b are a combination database and application server, which can handle queries launched by the SSPs. It stores data for handling relatively simple queries, and also provides instructions to the SSP for executing more complicated call handling applications. The SCP communicates with the SSPs using an AIN protocol, and provides the appropriate information regarding how a call at the SSP should be handled. The SCPs are also deployed in mated pairs, so that if one is unavailable, the other can seamlessly pickup the load. This type of configuration is sometimes called an "active-active" configuration as both SCPs are typically running and handling queries. One complication of this type of architecture is that data that is updated on one SCP must be synchronized with the other SCP, since they are logically viewed as a single SCP.

As noted, the SCPs communicate to the SSPs using a standard AIN protocol, and execute custom applications designed around the AIN protocol. Because the SCPs control the SSPs and potentially impact millions of subscribers, they are thoroughly tested, and operate on a highly reliable processing platform. As can be expected, SCPs are fairly expensive, and their operation is controlled by the telephone company. It is imperative to the telephone network provider that these systems be stable and reliable. Consequently, the whole telecommunications architecture is designed to be tolerant of faults.

As a consequence, there is a tension between designing the SCPs to be flexible platforms that can accommodate new service offerings, and desiring the SCPs to be stable and reliable service platforms for providing services. Typically, stable and reliable service platforms are achieved by not adding new services (which frequently can cause unexpected problems). However, they are also designed to be flexible service platforms, which suggests that new applications can be readily accommodated, and this typically requires extensive testing.

One approach to achieving flexibility is to allow the SCPs to access data stored in traditional databases. This provides several benefits. First, there may already be data stored by a telecommunications service provider in databases for other reasons. Rather than duplicating the data in the SCP (which creates additional issues regarding data synchronization), the SCP may query the traditional database. Further, rather than expanding the data storage capabilities, or deploying additional SCPs (which are rather expensive), the existing SCPs can access the less expensive database systems.

Thus, there is often a need for SCPs to access databases in datacenters using commonly available data communication networks. These standard databases typically do not accommodate the AIN protocols, nor are the data communications networks interconnecting them designed to be as reliable as the telecommunications networks.

Figure 2:
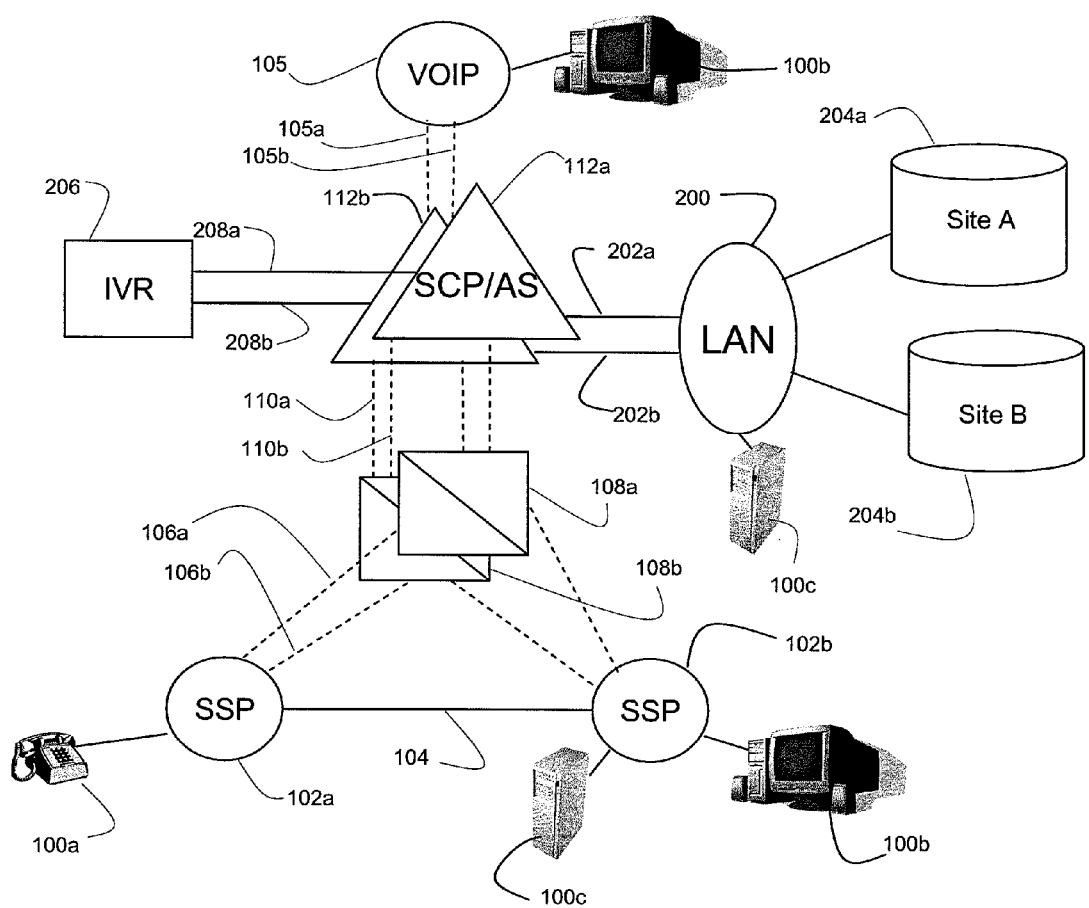
FIG. 2 illustrates one embodiment wherein two databases are accessed by the SCPs.

One solution to providing a flexible service architecture while maintaining stability via the SCPs is shown in FIG. 2. FIG. 2 shows one embodiment in which readily available database systems or servers 204*a*, 204*b* are accessible via a LAN 200 or other data communication network infrastructure for providing data to SCPs 112*a*, 112*b*. For instance, FIG. 2 shows a scheduler icon 100*c* that is connected to LAN 200. Therefore, the scheduler 100*c* may be able to access database systems or servers 204*a*,204*b*. For reliability and other reasons, such as facilitating planned maintenance, the databases may be deployed in pairs, so that if one database 204*a* is unavailable, the other 204*b* continues to run and provide data as needed to the SCP 112. Unlike the SCPs which may operate in an "active-active" configuration, the off-site databases 204*a*, 204*b* may operate in an "active-standby" mode. This means that data may be updated in Site A, but not necessarily updated in real time in Site B. It should be noted that "site" may include a database, server, or other components. Typically, data from Site A is used to periodically (or in near-real-time) update the data in Site B. The sooner that the alternative site is updated, the less likelihood there is for data synchronization problems to occur should there be a need to switch to the standby site, Site B. As for the LAN, it is not necessarily limited to any particular technology, and could be implemented via a wide-area-network (WAN) or a metropolitan area network (MAN).

The SCPs typically access the necessary data in the database by using TCP/IP protocol or the like. Thus, messages are sent from the SCP to the appropriate database using an IP address that identifies the primary site. In FIG. 2, for instance, Site A 204*a* may have an IP address, such as IP1, that is distinct from Site B 204*b*, which could be IP2. In the event of Site A becoming unavailable, the SCP may use the IP address of Site B. This may require each SCP to maintain a table of each IP address for a given application, which may be duplicated on Site A and Site B. Maintaining a table with both IP addresses values is not by itself difficult. However, the question of deciding when to switch to an alternative IP address is more difficult.

In SS7, this functionality is provided in part by the STPs, which provide for 'alias' addressing. An alias address is an address which can be mapped to one of two other addresses, which typically result in routing the message to one of two elements, based on which element is operational. Procedures are defined within SS7 for the automatic detection and failover in case of a link or network element failure and the use of an alias address avoids encumbering the application with details of this process. While these procedures could be incorporated into the SCP for communication to the datacenter, this would require functionality to be added to the LAN infrastructure and the databases. Customizing the operation of the LAN and database operation would negate part of the benefits of using readily available platforms for the LAN and the databases.

A service provider may provide logic that exercises the interface with the external systems or sites, which may be isolated from the logic controlling the PSTN and VoIP network. External scripts may be written in a manner so as to inject queries into the sites, which call the logic that communicates with the external systems, such as Site A and Site B. The scripts may be composed in Unix shell script or various other types of computer code. The scripts may automatically, or by manual triggering, send queries to, for example, Site A and/or Site B. The manual triggering may include making a call with a telephone, typing a command or other information into a terminal, or other ways of interacting with the network. The query may include a subscriber's telephone number or other information. If a query is sent to a site and the site is not functioning properly, then the site may not process the query and may fail to respond. If the logic fails to detect a response from the primary or active site, then a different site may be automatically selected as the primary or active site. Also, an operator may be notified by way of an alarm or the like when a site fails to respond.

If Site A and/or Site B process a query and respond, then the response(s) may be stored. The response may include subscriber data or other forms of data. The response may also be compared against responses from other sites or against an expected answer. For instance, Site A may respond with answer A. If Site B responds with answer A, then Site A and Site B are in synch. It should be noted that the logic may allow for some deviation between answers, i.e., a tolerance level. However, if the answers from each site are different or outside of the tolerance level, then the logic may trigger an alarm or the like or a process for synching the sites. If one site responds with an answer that is not the expected answer or outside of the permitted deviation, then the logic may change which site is active and which is passive and/or notify an operator by way of an alarm or the like.

One approach to deciding which site or sites should be active and which site or sites should be passive is to provide a mechanism in the SCP allowing a manual or automatic redirection of messages to a secondary database(s). This would direct the SCP to use the secondary IP address. Particularly for manual redirection, a flag or other type of status indication provides information as to whether the primary or secondary IP address would be used for all messages sent from the SCP. Since it is presumed that the primary database is usually available, a manual mechanism would provide an effective cost/benefit solution of providing backup access with minimal infrastructure development cost. This would allow use of readily available LANs and databases, with minimal impact to the SCP functionality. On the other hand, an automatic redirection would provide a system that may redirect queries to a desired IP address in manner that is more efficient and requires less time than a manual redirect system. In effect, the logic may determine that a primary or active site is not functioning properly and may redirect queries to a different site, i.e., the new primary or active site.

The mechanism for reconfiguring the SCPs to switch over from a primary site (e.g., Site A) to a secondary site, Site B, can be accomplished in different ways. One approach is to define procedures in the SCP application level program to detect failure at the application layer, and communicate the need to a management application to switch over to the secondary site. This approach requires the SCP application to be modified.

Another approach is to indicate the need to switch from the primary to the secondary data center via human intervention. Essentially, the determination that there is a need to switch over is accomplished by a human, most likely in response to observation of other systems, notifications, alarms, or outputs. For example, alarms or other notifications may bring to the attention of a systems administrator that one of the data centers or databases is inoperable. The determination that a datacenter is unavailable can be due to a cataclysmic event, such as total failure of power, destruction of the premises (e.g., fire, tidal wave, earthquake, etc.), or can be a planned event (such as the primary data center being taken off line for maintenance or upgrading).

The human interaction can occur in a variety of ways. As shown in FIG. 2, an interactive voice response unit (IVR) 206 can be used to provide a man-machine interface allowing the caller to provide appropriate indications as to which data site may be used. IVRs are well known in the area of telecommunications and provide prompts to a caller and receive DTMF signals in response. The IVR collects information and instructs the SCP to set the flag indicating whether the primary database is available or not. Various embodiments are possible, such as the IVR instructing the SCP to set a flag, which an application on the SCP then maps to an IP address, or the IVR could simply indicate which IP address should be used (primary or secondary). Further details regarding an exemplary IVR process are described by U.S. patent application Ser. No. 11/608,675 filed Dec. 8, 2006, entitled Systems and Methods For Using The Advanced Intelligent Network To Redirect Data Network Traffic, the contents of which are incorporated by reference fully herein.

The IVR is one approach for allowing the user to indicate the switchover to the alternate data site. This approach can be embodied with other equipment, other than a dedicated IVR. For example, the SSP has functionality that can be controlled by SCP so as to provide an IVR-like functionality of providing prompts to a caller, authorizing information entered by the caller, and setting a flag based on analyzing the user's input. Essentially, the AIN infrastructure of the SCP and SSP can be defined to accomplish the SCP's switch over to a backup datacenter.

Another embodiment uses a web-based interface for the user to manually indicate a switchover to a secondary database. In this case, the user could log onto a secure web site, which prompts the user for identification, passcode, and/or other forms of security information. The process of identifying and authenticating users is well known in the art. The user would then be prompted, via text or graphics, as to what data center should be used. The system could provide an immediate switch-over (as in the case of an unplanned outage of the primary data center) or the system could request a time for effecting the switch over (as in the case of a planned outage of the primary data center).

Regardless of whether a voice or web-based interface is used, the same mechanism can be used to redirect queries to the primary data center. Thus, when the primary data center is returned to an operation or on-line status, queries can be redirected via the same mechanism.

This approach provides an easy, cost-effective approach for quickly re-routing queries to a secondary data center, which is located outside of the public switched telephone network and VoIP, without having to reprogram the service logic or having to modify the routing tables in routers. This approach allows switchover to a secondary site even when communication links are operational from the SCP to the primary data center, but problems are encountered in the application layer, which the application may not be able to readily detect. This approach also helps maintenance personnel, who are trained to maintain the day-to-day operations, maintain operation without having to involve trained support personnel who would otherwise have to be involved in ascertaining and correcting the problem. Further, the change can be made remotely, using any public telephone, which facilitates timely changeover without having to wait for authorized or trained personnel to be physically on-site.

In order to facilitate any subsequent switchover, the secondary data center(s) can be verified to insure that the secondary data center(s) are online and are being appropriately synchronized and to identify and correct any instances in which a secondary data center is not appropriately synchronized. Advantageously, this verification can be performed automatically, such as in response to an input provided by a scheduler or other workstation that may be executing a predefined script or other software program that defines the timing of such verification activities or in response to a telephone call, such as by an administrator or the like. Moreover, this verification process can provide the added benefit of also confirming that the primary data center is connected and is responding appropriately.

Figure 3:
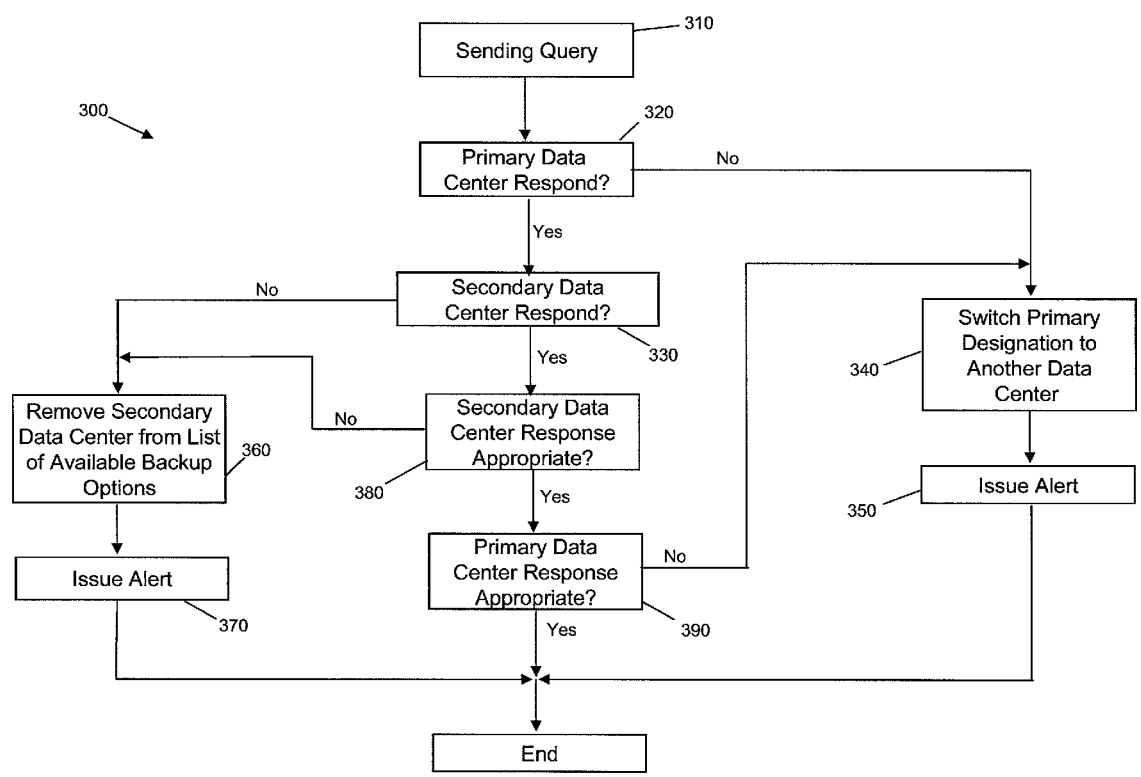
FIG. 3 illustrates one embodiment of automatically verifying the functioning of at least one data center and redirecting queries.

FIG. 3 illustrates one embodiment 300 of automatically verifying the operation of one or more data center(s). In FIG. 3, queries are sent 310 from a service control point to a data center, such as Site A and/or Site B. As described above, queries may be sent automatically to a plurality of data centers, such as in response to an input provided by a scheduler or other workstation or in response to a telephone call. For instance, in FIG. 2 in which Site A is currently operating as the primary data center and Site B is currently operating as the secondary data center, queries may be sent from the SCPs 112a,112b to at least the secondary data center, e.g., Site B 204b. As described below, a query can also be sent to the primary data center, e.g., Site A 204a. Determinations 320, 330 are initially made on whether a response is received from each queried data center at the SCP. For example, the SCPs 112a,112b typically make this determination after waiting a predefined period of time after issuing the queries, such as a period of time that is longer than the time normally required to receive responses from the data centers.

If a data center that has been queried fails to respond, the SCP may issue an alert or otherwise note that the connection with the data center that has failed to respond may have been lost such that a technician may further investigate and correct any connectivity problem. See blocks 350, 370. In one embodiment, the SCP may query any data center that has not responded one or more additional times to confirm the non-responsiveness of the data center. Further action may be taken depending upon the current role of the data center that failed to respond. If the primary data center fails to respond, the SCP may automatically direct subsequent queries to a secondary data center, e.g., Site B, such that the former secondary data center assumes the role of the primary data center, typically until the SCP issues another redirect instruction indicating that queries should again be routed to Site A, for example. See block 340. Alternatively, if a secondary data center fails to respond, the SCP may avoid switching the primary designation to that particular data center until connectivity has been reestablished and the data center has been appropriately resynchronized. See block 360.

For at least the secondary data center(s) that respond, a determination 330 may be made, typically by the SCP absent human intervention, as to the appropriateness of each secondary data center(s)' response to determine, for example, if the secondary data center(s) are being appropriately synchronized with the primary data center. See block 380. The SCP can also determine the appropriateness of the response provided by the primary data center, if desired. See block 390.

The SCP typically determines if a secondary data center responds appropriately to a query by first determining if the primary site actually responds and, if so, if the response either matches an expected response or is within a predefined tolerance of the expected response. The expected response that is utilized by the SCP to determine the appropriateness of a data center's response may be predefined. Alternatively, since the verification process is typically performed to confirm or test the synchronization of the secondary data center(s) to the primary data center, the expected response may be obtained from the response to a similar or identical query by the primary data center, such as a secondary site known to be properly functioning and synchronized, in response to the same query that was issued to the secondary data center(s). If the response from the secondary data center(s) matches or is within a predefined tolerance of the expected response, the secondary data center(s) will remain a viable option for assuming the responsibilities of the primary data center and for fielding subsequent queries if the SCP should determine that the primary data center loses connectivity or otherwise fails. If, however, the response from the secondary data center(s) does not match or is not within a predefined tolerance of the expected response, the SCP may issue an alert or otherwise note that the response provided by the secondary data center is inappropriate such that a technician may further investigate and correct any synchronization or other problems. See block 370. In addition, the SCP may no longer consider the secondary data center to be a viable option for assuming the responsibilities of the primary data center until the issues with the secondary data center are resolved and the secondary data center again responds appropriately. See block 360. In one embodiment, the SCP may query any secondary data center that has not provided an appropriate response to confirm that the responses from the secondary data center(s) continue to be inappropriate.

As the primary and secondary data centers may be widely spaced geographically, the synchronization of the secondary data center(s) to the primary data center may be subject to some delay. As such, the SCP may determine that the response provided by a secondary data center is appropriate even if its response does not precisely match the response provided by the primary data center if the response from the secondary data center is within a predefined tolerance of the response from the primary data center, with the predefined tolerance being defined in such a manner as to accommodate or otherwise compensate for the anticipated delay in synchronizing the secondary data center with the primary data center. Alternatively, the anticipated synchronization delay may be accommodated by first querying the primary data center and only thereafter querying the secondary data center with the query issued to the secondary data center being delayed by a predefined time that equals or exceeds the synchronization period such that the secondary data center will have been synchronized prior to providing its response.

The SCP may also consider the appropriateness of the response provided by the primary data center by comparing its response to an expected response, such as a predefined response or a response provided by one or more secondary data center(s). As described above in conjunction with a non-responsive primary data center, if the SCP determines that the response provided by the primary data center is inappropriate, the SCP may issue an alert or otherwise note that the primary data center has provided an inappropriate response such that a technician may further investigate and correct any connectivity problem. See block 350. In one embodiment, in the event of an inappropriate response, the SCP may query the primary data center one or more additional times to confirm the issues with the primary data center. Also, as with a non-responsive primary data center, the SCP may automatically direct subsequent queries to a secondary data center, e.g., Site B, such that the former secondary data center assumes the role of the primary data center, typically until the SCP issues another redirect instruction indicating that queries should again be routed to Site A, for example. See block 340. This automated site verification technique may be repeated prior to each query, at predefined intervals or in some other repeated manner.

Figure 4:
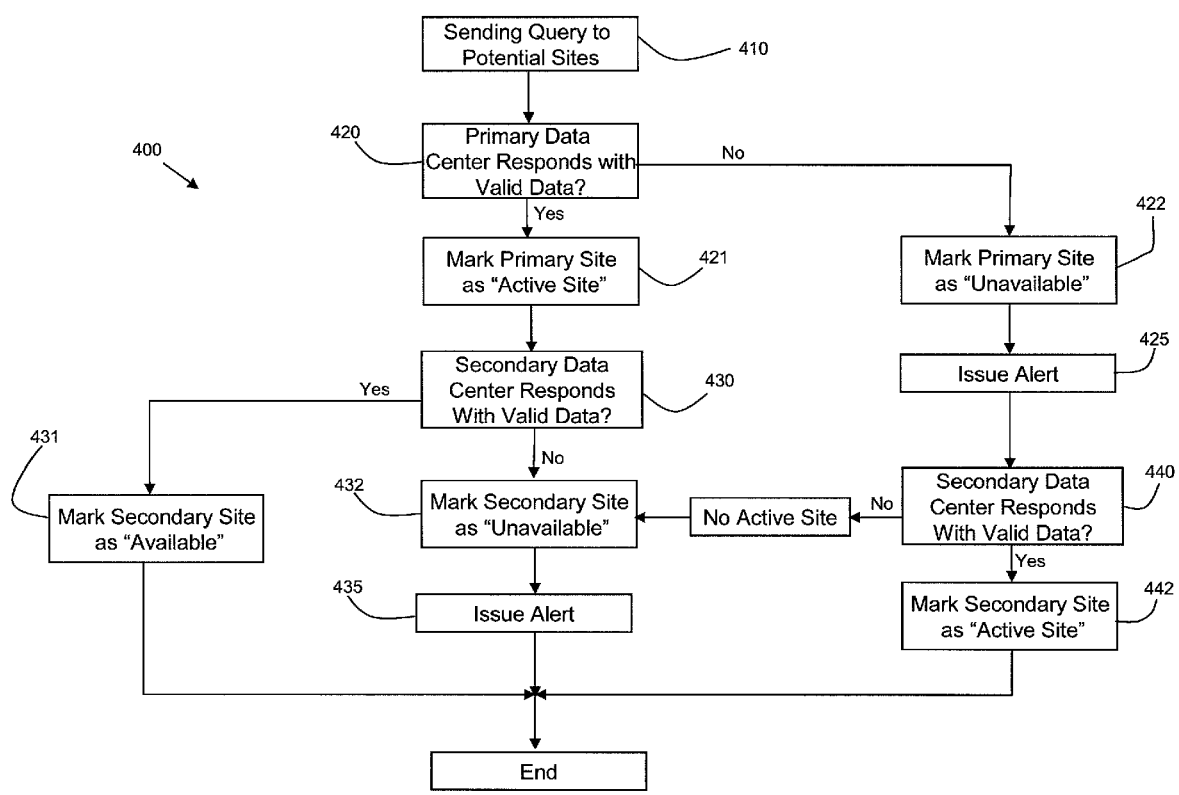
FIG. 4 illustrates another embodiment of automatically verifying the functioning of at least one data center and redirecting queries.

FIG. 4 illustrates another embodiment 400 of automatically verifying the operation of one or more data center(s). In FIG. 4, queries are sent 410 from a service control point to a data center, such as Site A and/or Site B. As described above, queries may be sent automatically to a plurality of data centers, such as in response to an input provided by a scheduler or other workstation or in response to a telephone call. For instance, in FIG. 2 in which Site A is currently operating as the primary data center and Site B is currently operating as the secondary data center, queries may be sent from the SCPs 112*a*,112*b* to at least the secondary data center, e.g., Site B 204*b*. As described above, a query can also be sent to the primary data center, e.g., Site A 204*a*. If a data center that has been queried fails to reply with a valid response, the SCP may issue an alert or otherwise note that the connection with the data center that has failed to respond may have been lost such that a technician may further investigate and correct any problem. See blocks 425 and 435.

In FIG. 4, determination 420 is initially made on whether an appropriate response is received from the primary data center at the SCP. For example, the SCPs 112*a*,112*b* typically make this determination after waiting a predefined period of time after issuing the queries, such as a period of time that is longer than the time normally required to receive responses from the data centers. If a valid response is not received, such as a response is not within a predefined tolerance for expected responses, or the like, then the primary data center's status may be changed by the SCP such that it is unavailable 422 for subsequent queries. With the change in status of the primary data center, the SCP may automatically direct queries to another data center until another redirect instruction indicating queries should again be rerouted to the primary data center. If a valid response is received by the SCP, then the primary data center's status as determined by the SCP remains active or may be changed by the SCP to be active 421. Therefore, the SCP may automatically direct queries to the primary data center.

Next, in FIG. 4, determination 430,440 is made on whether an appropriate response is received from the secondary data center at the SCP. If the primary data center responds with a valid response, then the SCP may select the secondary data center's status to be available 431 or unavailable 432 for queries depending on whether the secondary data center responds with a valid response or fails to respond with a valid response, respectively. On the other hand, if the primary data center does not respond with a valid response, then the SCP may select the secondary data center's status to be active 442 or unavailable 432 for queries depending on whether the secondary data center responds with a valid response or fails to respond with a valid response, respectively. If the secondary data center's status is selected to be active, then the SCP may automatically direct subsequent queries to the secondary data center until the SCP issues another redirect instruction indicating that queries should again be routed to the primary data center. As noted in FIG. 4, if all data centers fail to respond with a valid response, then the SCP may not mark or select any data center as an active data center.

Thus, automatic verifying and redirecting may provide an efficient and rapid response to the detection of a dysfunctional site. Automatic verifying and redirecting may function without the input from a human. This is particularly advantageous when considering operations at night or other times when it may not be efficient to have a human monitoring the system. Basically, an application for verifying sites and redirecting queries may provide cost savings when considering the cost of paying humans to monitor the network. Finally, automatic verifying and redirecting may provide greater reliability and stability for the network.

It is understood that the operations described for the illustrated method of FIG. 3 and FIG. 4 may be performed through hardware, software, or a combination thereof. Therefore embodiments may take the form of hardware systems and/or apparatuses, software, or combinations thereof. As an example, embodiments may include a computer program product that includes a computer-readable storage medium (e.g., memory) and one or more executable portions (e.g., software) stored by the computer-readable storage medium for performing the operations described herein upon execution thereof. For example, the executable portions may be stored in the memory of the SCPs 112a,112b of the system of FIG. 2 and executed by a processing element of the SCPs, such as a microprocessor or other computing device, such that a service provider may automatically perform the functions described herein including, for example, those depicted in FIG. 3, FIG. 4, and described above.

In the preceding specification, various embodiments of the claimed invention have been described. It will, however, be evident that various modifications and changes may be made thereunto without departing from the broader spirit and scope of the invention as set forth in the claims that follow. For example, while the system has been shown to have two sites or datacenters, the system may contain more or less sites or datacenters than two. The specification and drawings are accordingly to be regarded as an illustrative rather than restrictive sense.

That which is claimed:

1. A method, comprising:
    sending a query from a service control point to a first data center and a second data center, said query relating to handling of a call;
    determining whether a response to the query from the first data center is appropriate by comparing responses from both the first data center and the second data center;
    automatically altering routing logic employed by the service control point to route queries to a data center if it is determined that the first data center provided an inappropriate response to the query; and
    changing the status of the first data center to unavailable when the response from the first data center is inappropriate.
2. The method of claim 1,
    wherein said query includes a telephone number; and
    wherein sending said query from a service control point to the first data center and the second data center comprises automatically requesting data from at least the first data center.
3. The method of claim 2,
    wherein said query is launched by a service switching point which performs telephone call switching.
4. The method of claim 1 further comprising notifying an operator when the response from either the first or the second data center is inappropriate.
5. The method of claim 1, wherein determining whether the response is appropriate comprises determining whether the response is within a predefined tolerance of an expected response.
6. An apparatus, comprising:
    a service control point used to provide call handling information configured to:
        send a query from said service control point to a first data center and a second data center, said query relating to handling of a call;
        determine whether a response to the query from the first data center is appropriate by comparing responses from both the first data center and the second data center;
        automatically alter routing logic employed by the service control point to route queries to a data center if it is determined that the first data center provided an inappropriate response to said query; and
        change the status of the first data center to unavailable when the response from the first data center is inappropriate.
7. The system of claim 6,
    wherein said query includes a telephone number.
8. The system of claim 6,
    wherein the service control point is further configured to automatically request data from both the first data center and a second data center.
9. The system of claim 6, wherein the service control point is further configured to store responses from the first data center and the second data center.
10. The system of claim 6, wherein the service control point is further configured to notify an operator when the response is not returned from the first data center.
11. The system of claim 6, wherein the service control point is further configured to determine whether the response is within a predefined tolerance of an expected response.
12. A non-transitory computer-readable storage medium having computer executable program code portions stored therein, the computer-readable storage medium comprising:
    a first computer executable program code portion for controlling a service control point to send a query from said service control point to a first data center and a second data center, said query relating to handling of a call;
    a second computer executable program code portion for controlling the service control point to determine whether a response to the query from the first data center is appropriate by comparing responses from both the first data center and the second data center;
    a third computer executable program code portion for controlling the service control point to automatically alter routing logic employed by the service control point to route queries to a data center if it is determined that the first data center provided an inappropriate response to said query; and
    a computer executable program code portion for controlling the service control point to change the status of the first data center to unavailable when the response from the first data center is inappropriate.
13. The non-transitory computer-readable storage medium of claim 12 wherein the first computer executable program code portion includes a program code portion for controlling the service control point to automatically request data from at least the first data center.
14. The non-transitory computer-readable storage medium of claim 12 wherein the first computer executable program code portion further includes a program code portion for controlling the service control point to automatically request data from both the first data center and a second data center.
15. A method, comprising:
    sending a query, from a service control point used to provide call handling information, to a first data center and a second data center, said query relating to handling a call and including a telephone number;

determining if a response to the query is received at the service control point from the first data center;

if a response is received at the service control point, determining whether the response to the query from the first data center is appropriate by comparing responses from both the first data center and the second data center;

automatically altering routing logic employed by the service control point to route subsequent queries to a data center other than the first data center if it is determined that the first data center failed to provide a response to the query or that the first data center provided an inappropriate response to the query; and changing the status of the first data center to unavailable when the response from the first data center is inappropriate.

16. The method of claim 15 wherein said query is triggered by a telephone call.

17. The method of claim 15, wherein said service control point is controlled by a telephone company; and wherein said first data center is external to a telephone network that includes the service control point and isolated from control of the telephone network.

18. The method of claim 15, wherein said service control point communicates with the switching service point using an AIN (Advanced Intelligent Network) protocol used in said telephone network and sends said query to at least the first data center using TCP/IP signaling.

19. The method of claim 18, wherein sending said query to at least a first data center includes:

using an IP address that identifies said first data center.

20. The method of claim 19, wherein automatically altering routing logic employed by the service control point to route queries to a data center includes:

using a secondary IP address that identifies the second data center instead of using the IP address corresponding to the first data center to route queries to the second data center.

21. The method of claim 15, further comprising:

triggering the synchronization of the first data center with the second data center in response to determining that the response to the query from the first data center is not an appropriate response.

22. The method of claim 15, wherein sending the query comprises sending the query to the first data center using a first IP address that identifies the first data center and sending the query to the second data center using a second IP address that identifies the second data center.

23. The method of claim 5 further comprising:

deciding, based on the appropriateness of the response from the first and second data centers, which data center should be a primary data center and which should be a secondary data center.

24. The method of claim 1, wherein said determining is performed by said service control point and wherein said first data center is external to said service control point.

25. The method of claim 1, further comprising:

determining, prior to determining whether a response to the query from the first data center is appropriate, whether a response to the query was received from the first data center.

26. The method of claim 25, further comprising:

operating the service control point to switch from using said first data center as a primary data center to using a second data center as a primary data center when it is determined that a response to the query was not received from the first data center.

27. The method of claim 1, wherein the responses from the first and second data centers include subscriber data.

28. The method of claim 1, further comprising changing the status of the first data center to available when the response from the first data center is appropriate.

29. The method of claim 15, wherein determining if a response to the query is received comprises determining if a response to the query is received within a pre-determined period of time.

30. The method of claim 29 further comprising determining the appropriateness of the response if it is received within the pre-determined period of time.

31. The method of claim 29 wherein the pre-determined period of time is longer than the time normally required to receive responses from the data centers.

* * * * *